United States Patent
Uchida et al.

(10) Patent No.: US 6,456,786 B1
(45) Date of Patent: *Sep. 24, 2002

(54) LENS-EQUIPPED FILM UNIT

(75) Inventors: Mitsuhiro Uchida; Kazumi Koike, both of Minami-Ashigara (JP)

(73) Assignee: Fuji Photo Film Co., Ltd., Kanagawa (JP)

( * ) Notice: Subject to any disclaimer, the term of this patent is extended or adjusted under 35 U.S.C. 154(b) by 50 days.

This patent is subject to a terminal disclaimer.

(21) Appl. No.: 09/609,938

(22) Filed: Jun. 30, 2000

(30) Foreign Application Priority Data

Jul. 1, 1999 (JP) .......................... 11-187913

(51) Int. Cl.$^7$ .................. G03B 17/02; G03B 7/085; G03B 9/02; G03B 7/28
(52) U.S. Cl. .................. 396/6; 396/257; 396/449; 396/505
(58) Field of Search ................ 396/6, 61, 64, 396/161, 162, 170, 213, 214, 227, 228, 241, 257, 505, 449

(56) References Cited

U.S. PATENT DOCUMENTS 5,634,163 A  5/1997 Kamata 6,222,995 B1 * 4/2001 Uchida .......................... 396/6

FOREIGN PATENT DOCUMENTS

| JP | A10260507 | 9/1998 |
| JP | A10333287 | 12/1998 |
| JP | 11305396 | 11/1999 |

* cited by examiner

Primary Examiner—Russell Adams
Assistant Examiner—Arthur A Smith
(74) Attorney, Agent, or Firm—Birch, Stewart, Kolasch & Birch, LLP

(57) ABSTRACT

A lens-equipped film unit comprises a photographing mechanism including a photographic lens, a shutter of a fixed speed, an aperture and a strobe, and an unexposed photographic film has being charged therein. The photographing mechanism satisfying the relationship:

$$7.0 \leq \log_2(G^2) + \log_2(1/T) \leq 12.5,$$

wherein T represents shutter speed (sec) of the shutter and G represents guide number (ISO 100.m) of the strobe. The film unit further comprises a photometer to measure a subject light quantity and to output light quantity signal corresponding to the subject light quantity, and an exposure quantity controller toward the charged photographic film in accordance with the light quantity signal.

15 Claims, 7 Drawing Sheets

LENS-EQUIPPED FILM UNIT

CROSS-REFERENCE TO RELATED APPLICATIONS

This application is based upon and claims the benefit of priority from the prior Japanese Patent Application No. 11-187913, filed Jul. 1, 1999, the entire contents of which are incorporated herein by reference.

BACKGROUND OF THE INVENTION

The present invention relates to a lens-equipped film unit capable of taking a photograph of appropriate density-in any photographing environment.

Various types of lens-equipped film units each comprising a unit body wherein simple photographing means such as a photographic lens, a shutter and a film winding up apparatuses are accommodated; and an unexposed photographic film charged in the unit body at the time of manufacturing thereof, are being marketed. The lens-equipped film units include one having a built-in strobe for enabling photographing in the nighttime or a dark place such as the interior of a building.

The lens-equipped film unit having a built-in strobe is so designed that a combination of shutter speed, stop down value and film sensitivity are fixed so as to cope with the brightness during the daytime and that, at the time of photographing in a dark place such as the interior of a building, appropriate strobe photographing is carried out as for a main subject located at a distance of, for example, about 1 to 4 m.

However, when strobe photographing is performed indoors or outdoors in the nighttime with the use of the conventional lens-equipped film unit having a built-in strobe, the background suffers from considerable under-exposure while a main subject such as a human suffers from over-exposure with the result that satisfactory prints cannot be obtained. One measure for solving this problem can be provided by the method disclosed in Jpn. Pat. Appln. KOKAI Publication No. (hereinafter referred to as JP-A-) 10-333287 wherein the densities of a main subject and background are balanced by using a film of ISO 600 or more and by, only at the time of strobe photographing, setting the f-number of aperture at F8 or less. However, this method has a grave drawback in that when no strobe is used at the time of photographing indoors or in the nighttime, no quality improvement can be attained. When a strobe is used outdoors in the daytime, over-exposure exceeding the film latitude occurs to thereby lower the print quality.

JP-A-10-333287 discloses a method of changing a shutter speed, interlocked with a strobe switch. However, ensuring the precision of shutter speed switching is difficult from the viewpoint of appropriate manufacturing, and a low-speed shutter invites camera movement and other causes of image quality lowering to thereby lead to deterioration of the sharpness of photographic prints.

Further, JP-A-10-260507 discloses a lens-equipped film unit characterized in that it is fitted with a photometric circuit capable of detecting the level of subject luminance relative to given. luminance and means for switching a stop down value- in accordance with the level of subject luminance detected by the photometric circuit. In this patent application specification, it is described that it is desirable to control the use or non-use of strobe flashing in accordance with the detection result of the photometric circuit. However, it has been found that the lens-equipped film unit disclosed therein has difficulty in taking a photograph in which the densities of main subject and background are well balanced, although the lens-equipped film unit enables reducing photographs of under-exposure as compared with the conventional lens-equipped film unit. The disclosed lens-equipped film unit has a further drawback that automatic strobe flashing occurs in circumstances where a strobe should not be used.

Still further, in the lens-equipped film unit disclosed in JP-A-9-5817, aperture control is performed by measuring a subject light quantity by means of a photoconductive element and operating an electromagnet in accordance with the measurement of the light quantity to thereby move an aperture plate furnished with an aperture opening. In the use of this lens-equipped film unit, exposure control can be automatically effected in conformity with the subject light quantity, so that any person can easily conduct photographing with appropriate exposure. However, this lens-equipped film unit, although realizing an improvement in over-exposure quality, is unsatisfactory in improving the density ratio of main subject to background when photographing a low-luminance subject.

BRIEF SUMMARY OF THE INVENTION

The object of the present invention is to resolve the above problems and to provide a lens-equipped film unit which realizes an appropriate density ratio of main subject to background while photographing indoors or in the nighttime, and allows the user per se to make a selection as to the use or non-use of strobe flashing and which can provide preferable photographs within an appropriate exposure while photographing outdoors in the daytime, irrespective of the use or non-use of strobe. That is, the object of the present invention is to provide a lens-equipped film unit which can provide desirable photographs in any photographic environment.

Additional aspects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate presently preferred embodiments of the invention, and together with the general description given above and the detailed description of the preferred embodiments given below, serve to explain the principles of the invention.

The above object can be attained by the following lens-equipped film unit.

(1) A lens-equipped film unit comprising:
a photographing mechanism including a photographic lens, a shutter of a fixed speed, an aperture and a strobe equipment; and an unexposed photographic film has been charged therein, wherein
the photographing mechanism satisfying the relationship:

$$7.0 \leq \log_2(G^2) + \log_2(1/T) \leq 12.5$$

wherein, T represents shutter speed (sec) of the shutter and G represents guide number (ISO 100.m) of the strobe equipment; the film unit further comprising photometric means for outputting a light quantity signal corresponding to a subject light quantity; and a controlling means for changing an exposure quantity to the charged photographic film in accordance with the light quantity signal.

(2) The lens-equipped film unit as recited in item (1) above, wherein the controlling means controls the exposure quantity by changing a stop down value.

(3) The lens-equipped film unit as recited in item (1) above, wherein the controlling means controls the exposure quantity by changing a quantity of light transmitted through the photographic lens.

(4) The lens-equipped film unit as recited in any of items (1) to (3) above, wherein the photographing mechanism satisfies the relationship:

$$9.0 \leq \log_2(G^2) + \log_2(1/T) \leq 11.0.$$

(5) The lens-equipped film unit as recited in any of items (1) to (4) above, wherein $F_1$ representing the brightest stop down value that can be controlled by the controlling means satisfies the relationship:

$$4.0 \leq F_1 \leq 8.0.$$

(6) The lens-equipped film unit as recited in any of items (1) to (5) above, wherein the value $F_1$ satisfies the relationship:

$$5.0 \leq F_1 \leq 7.0.$$

(7) The lens-equipped film unit as recited in any of items (1) to (6) above, wherein $F_2$ representing the darkest stop down value that can be controlled by the controlling means satisfies the relationship:

$$12.0 \leq F_2 \leq 32.$$

(8) The lens-equipped film unit as recited in any of items (1) to (7) above, wherein the charged photographic film has a sensitivity of ISO 1000 or more.

DETAILED DESCRIPTION OF THE INVENTION

The lens-equipped film unit of the present invention is characterized by being fitted with photometric means for outputting a light quantity signal corresponding to a subject light quantity; and a controlling means for changing an exposure quantity to the film in accordance with the light quantity signal.

Most readily, CdS (cadmium sulfide) can be used as the photometric means for measuring a subject light quantity. Further, use can be made of a solar cell, CCD, MOS transistor, a photodiode, selenium or the like. Generally, elements capable of outputting a photometric result as an electrical signal can be utilized easily.

The changing of the exposure quantity to the photographic film can be accomplished by, for example, the method in which a stop down value is changed or the method in which the quantity of light transmitted through a lens is controlled by ND filters or the like. Most readily, the changing of the exposure quantity can be accomplished by providing two-stage controlling means, the one permitting a large exposure and the other permitting a small exposure. When the changing of stop down value is effected, the exposure quantity can be changed by application of two aperture plates with different opening diameters. When the quantity of transmitted light is controlled, the changing of exposure quantity can be realized by application of a ND filter. Occasionally, further multi-stage exposure controlling or non-staged continuously stepped exposure controlling can be effected.

When the two-stage exposure controlling is effected, a subject luminance at which switching is performed, is determined in advance. That is, the exposure is reduced when the subject luminance is higher than the predetermined one, and is increased when the subject luminance is lower than the predetermined one. The signal outputted by the photometric means is compared with the predetermined luminance in this manner, and interlocking with a mechanism capable of switching the quantity of exposure in accordance with the result of being larger or smaller, is effected. The switching of aperture can be realized by, for example, the method in which the aperture plate is physically moved or the method in which the substantial stop down value is changed by a concentration change of liquid crystal. In the method of physically moving the aperture plate, use can be made of a shape memory element capable of having configurational change depending on the passage of current as disclosed in JP-A-10-260507, the disclosure of which is incorporated herein by reference.

Also, use can be made of the method in which the aperture plate is moved by a motor. Further, the aperture plate can be moved by the use of an electromagnet as disclosed in JP-A-9-5817, the disclosure of which is incorporated herein by reference. The power required for moving the aperture plate can be obtained from a dry cell or secondary battery for strobe. Alternatively, the power can be obtained from a solar cell by making such a design that the moving of aperture plate is needed only in the instance of being greater than the predetermined luminance.

In the present invention, $F_1$ representing the brightest stop down value controllable which is set when the subject luminance detected by the above photometric means is lower preferably satisfies the relationship:

$$4.0 \leq F_1 \leq 8.0,$$

and most preferably satisfies the relationship:

$$5.0 \leq F_1 \leq 7.0.$$

When the exposure controlling is performed with the quantity of light transmitted through, for example, ND filters, however, regulation is effected with the stop down value realizing substantially the same exposure. This stop down value is determined by the brightness for enabling reproducing background at the photographing indoors or in the nighttime and the depth of field required for a lens-equipped film unit of a fixed focus and a fixed shutter speed. Furthermore, for realizing the above purpose, it is desirable to use a photographic film of ISO 1000 or more. Satisfying these requirements enables setting at a high shutter speed and enables taking a sharp photograph free from camera shake and subject movement.

Further, in the present invention, $F_2$ representing the darkest stop down value controllable which is set when the subject luminance detected by the above photometric means is higher preferably satisfies the relationship:

$$12.0 \leq F_2 \leq 32,$$

and most preferably satisfies the relationship:

$$16 \leq F_2 \leq 22.$$

Satisfying this requirement enables falling of the exposure quantity to photographic film within an appropriate range of exposure even if a high-luminance subject is photographed outdoors in the daytime to thereby provide high-quality photographic prints.

Still further, the lens-equipped film unit of the present invention attains the object of realizing an appropriate balance with respect to the density ratio of main subject to background at the time of using a strobe by satisfying the relationship:

$$7.0 \leq \log_2(G^2) + \log_2(1/T) \leq 12.5.$$

In this relationship, the shutter speed of the shutter equipment is represented by T (sec) and the guide number of the strobe equipment is represented by G (ISO 100.m). As a result of the inventors' extensive studies, it has been found that, when the above relationship is satisfied, the density ratio of main subject illuminated by strobe flash to background not reached by strobe flash is appropriately reproduced on photographic prints. It has been found that, at the photographing indoors or in the nighttime, an appropriate quantity of exposure throughout each print can be ensured and prints exhibiting an appropriate density ratio of main subject/background can be provided by combining the guide number, shutter speed and the above mentioned aperture switching method so that the above requirement can be satisfied. When the above relationship is satisfied, the guide number (G) is preferably in the range of 0.5 to 8.0, more preferably 2.0 to 7.0. The shutter speed (T) is preferably in the range of 1/30 to 1/250 sec, more preferably 1/60 to 1/150 sec.

Table 1 shows experimental results. Various indoor photographs were taken with the use of film of ISO 1600 at a stop down value of F 6.7 under the conditions specified in the table. The ratio of prints realizing an appropriate density ratio of main subject/background was calculated from the obtained prints.

TABLE 1

| T (sec) | G (ISO 100 · m) | $\log_2(G^2) + \log_2(1/T)$ | Realization % of an appropriate density ratio of main subject/background |
|---|---|---|---|
| 1/8 | 3.2 | 6.3 | 35% |
| 1/15 | 3.5 | 7.5 | 78% |
| 1/30 | 3.9 | 8.8 | 85% |
| 1/60 | 3.5 | 9.6 | 98% |
| 1/80 | 3.9 | 10.2 | 92% |
| 1/80 | 5.0 | 11.0 | 85% |
| 1/200 | 5.0 | 12.3 | 75% |
| 1/100 | 8.4 | 12.8 | 34% |
| 1/100 | 10.0 | 13.3 | 21% |

The lens-equipped film unit of the present invention more preferably satisfies the relationship:

$$9.0 \leq \log_2(G^2) + \log_2(1/T) \leq 11.0.$$

The light sensitive material for use in the present invention is preferably a color negative film of ISO 640 or more, more preferably a color negative film of ISO 1000 or more. With respect to the requirements to be satisfied by the color negative film, not only the sensitivity but also the graininess, color reproducibility and fluorescent lamp adaptability are very important in the present invention. Using high-aspect-ratio tabular grains which have an aspect ratio of 8 or more is preferred from the viewpoint of enhancing the graininess while increasing the sensitivity. With respect to the color reproducibility, it is desired to exhibit such a spectral sensitivity that faithful color reproduction based on a color function such as RGB can be effected. Using the 4th color sensitive layer described in JP-A-11-305396, the disclosure of which is incorporated herewith by reference, provides preferred means for realization. Further, the tinge of white fluorescent lamp can be recorded light-yellow, instead of being recorded greenish as with the conventional color negative film, by preparing a color negative film capable of realizing a color production close to faithful color reproduction. This performance is an extremely important characteristic for producing photographic prints of preferred color reproduction.

Further, the latitude of the color negative film is also important. The color negative film for use in the present invention preferably has such a latitude that an appropriate photographic print can be obtained at an exposure of light ranging from −1 to +4, more preferably such a latitude that an appropriate photographic print can be obtained at an exposure ranging from -2 to +5.

With respect to the standard for photographic film cartridge, use can be made of both the IX 240 type and 135 type.

When the lens-equipped film unit of the present invention is used for photographing in an environment of low luminance, a strobe is employed in accordance with the user judgment. In the use of a strobe in such a photographing environment, the image plane includes both the subject illuminated by strobe flash and the background not reached by strobe flash but illuminated by background light source. In this case as well, for providing photographic prints of appropriate color reproduction, preferred use is made of a strobe equipment having a spectral energy distribution that matches the color reproduction of the color negative film, such as disclosed in Japanese Patent Application No. 11-089298 charged in the lens-equipped film unit, together with a color negative film capable of faithful color reproduction. The terminology "match" used herein means that the strobe light color viewed through the color negative film is close to the color of background light source viewed through the color negative film. From the viewpoint of photographing frequency distribution, the most preferred method is provided by selecting a white fluorescent lamp as for the color of background light source and setting at such a spectral energy distribution of strobe that recording on the color film is performed with the color close to the light color.

EXAMPLE

Lens-equipped film unit No. 1

Figure 2:
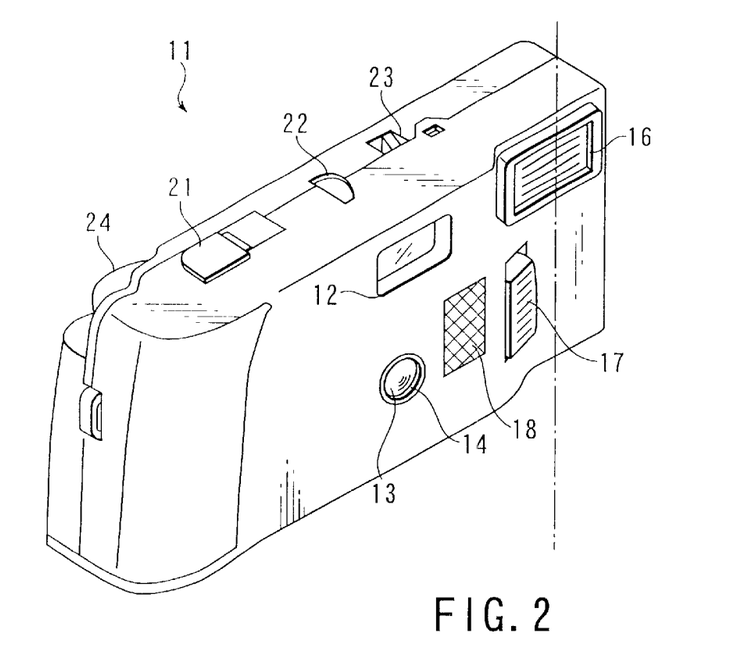
FIG. 2 is an entire perspective view of a lens-equipped film unit in which the aperture controlling mechanism of FIG. 1 is accommodated.

Referring to FIG. 2 showing the appearance of lens-equipped film unit 11, the front face of the lens-equipped film unit 11 is fitted with finder objective window 12, photographing window 14 through which photographic lens 13 is exposed, and strobe flashing window 16. Lens of brightness greater than f-number 7, namely lens satisfying f-number≦7, is preferably used as the photographic lens 13. In this Example, lens of f-number=6.7 is employed. Strobe charging switch 17 is slidably disposed under the strobe flashing window 16. When the strobe charging switch 17 is slid, a strobe charging (electrification) is initiated.

Solar cell 18 is mounted beside the strobe charging switch 17. The solar cell 18 is photometric means for performing aperture control in accordance with a subject light quantity. The solar cell 18 connected to analog meter (described later, numeral 57) accommodated in the main frame is, for example, based on amorphous silicon. The solar cell 18 generates electromotive force corresponding to a received light quantity, which electromotive force drives the analog meter.

A photoreceptive face of the solar cell 18 is arranged at a place nearer to the strobe flashing window 16 than the photographic lens 13 and nearer to the photographic lens 13 than the center line (indicated by dashed line in the figure) of the strobe flashing window 16. This arrangement prevents interception of the photoreceptive face of the solar cell 18 by fingers holding the body of the lens-equipped film unit 11. Furthermore, photometry can be effected in the same direction as that of subject light incident on the photographic lens 13 by virtue of the arrangement of the photoreceptive face at the front of the body of the lens-equipped film unit 11, so that accurate measurement of the subject light quantity can be accomplished.

The top of the lens-equipped film unit 11 is fitted with shutter button 21, film counter window 22 and charging completion indicating window 23. The back of the lens-equipped film unit 11 is fitted with winding up knob 24 and finder eyepiece window (see numeral 26 of FIG. 3).

Figure 3:
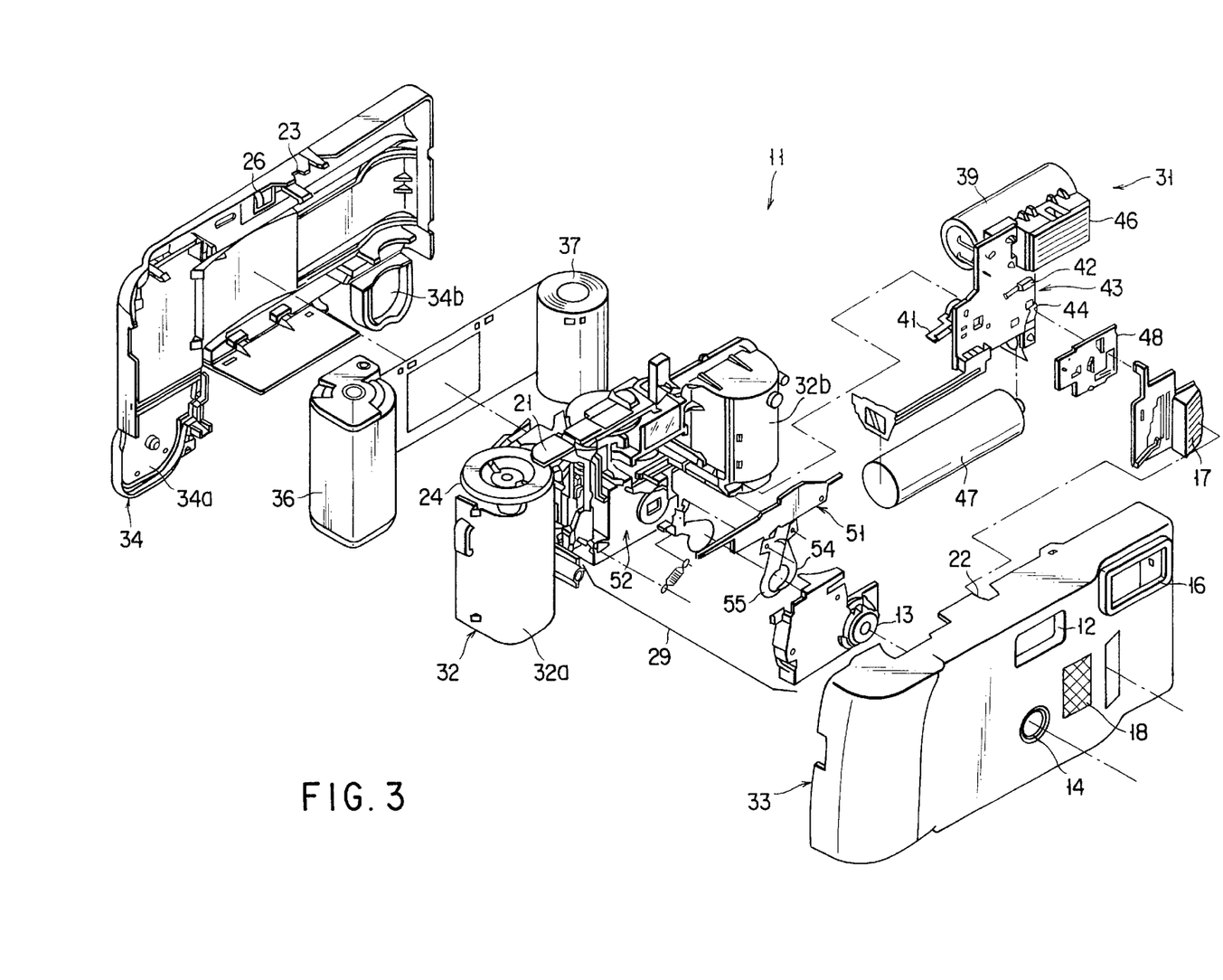
FIG. 3 is an exploded perspective view of the lens-equipped film unit of FIG. 1.

Referring now to FIG. 3, the lens-equipped film unit 11 comprises a unit body including body base 32 having its center fitted with exposure part 29 and strobe equipment 31, front cover 33 and rear cover 34, the front cover 33 and rear cover 34 extending over the front and rear parts of the body base 32, respectively, and further comprises cartridge 36 and photographic film 37 drawn out from the cartridge 36 and rolled. Film of ISO sensitivity 1000 or more is preferably used as the photographic film 37. In this Example, use is made of film of ISO sensitivity 1600.

The cartridge 36 and photographic film 37 are assembled in cartridge housing chamber 32a and film housing chamber 32b formed in the body base 32, respectively, in advance during the manufacturing of the lens-equipped film unit 11. Under the rear cover 34, there are integrally formed bottom lids 34a, 34b light-tightly covering bottom openings of the cartridge housing chamber 32a and film housing chamber 32b, respectively. The bottom lid 34a is opened at the time of taking out the cartridge 36 in which the photographic film 37 having been used in photographing is wound.

The winding up knob 24 is secured to an upper part of the cartridge housing chamber 32a, and a winding up shaft integrally formed at a lower side thereof is engaged with a spool of the cartridge 36. Each frame of photographic film 37 having been used in photographing is wound into the cartridge 36 by rotating the winding up knob 24 upon each photographing. Interlocked with the winding up of each film frame, a shutter mechanism assembled in the exposure part 29 is charged for subsequent photographing. Further, upon completion of feeding of one film frame, the rotation of the winding up knob 24 is locked by a lock lever assembled in the exposure part 29.

The strobe equipment 31 comprises circuit board 43 fitted with circuit parts such as main condenser 39, synchro switch 41, strobe flashing control switch 42 and a step-up coil; flashing part 46 including a strobe discharge tube, a reflector and other components; and power source battery 47. The flashing part 46 is exposed outside through the strobe flashing window 16. In the circuit board 43, a circuit pattern is printed and various circuit elements are mounted so as to provide a strobe circuit. The front of the circuit board 43 is fitted with not only the strobe flashing control switch 42 but also charging switch armature 44 and, arranged in front thereof, support plate 48 supporting the strobe switch 17.

The charging switch armature 44 is one for initiating a charging to the main condenser 39, and on/off thereof is effected by sliding of the strobe switch 17. The synchro switch 41 is one for feeding a trigger signal to the strobe circuit to thereby effect strobe flashing and is operated synchronously with the push down of the shutter button 21. The strobe flashing control switch 42 is one for controlling the on/off of strobe flashing in accordance with a subject light quantity and, interlocked with cam plate 51, is switched.

The exposure part 29 comprises, as a base, dark box base 52 protruding forwards in the form of a square tube and is fitted with not only a shutter mechanism and a winding up mechanism but also a finder mechanism. The back of the dark box base 52 is provided with an exposure framework, which limits a one-frame exposure range on the frontal surface of photographic film 37 fed to photographing position.

Figure 4:
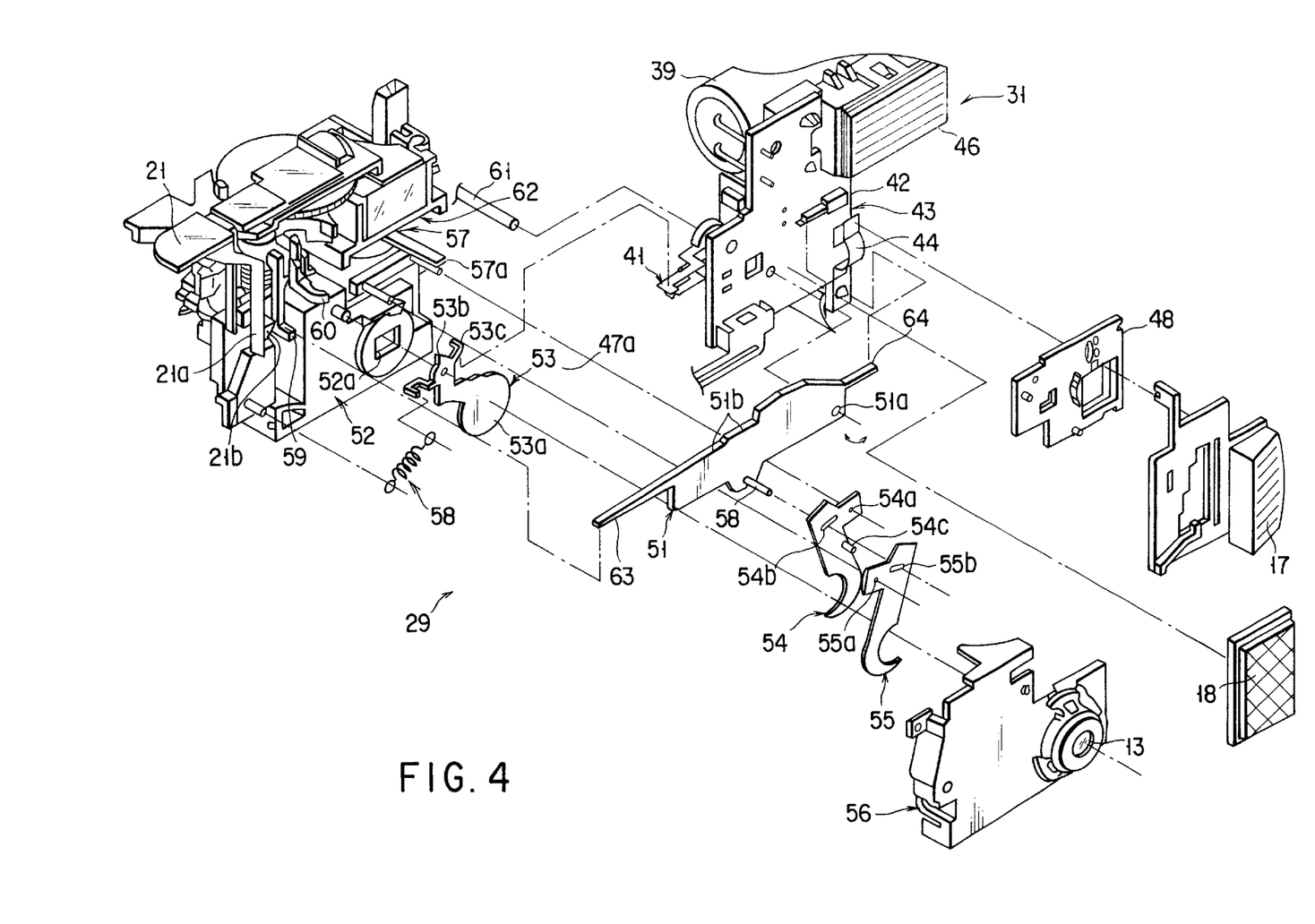
FIG. 4 is an exploded perspective view showing principal parts of the aperture controlling mechanism.

Referring to FIG. 4, the front of the dark box base 52 is provided with shutter opening 52a and, ahead thereof, fitted with shutter blade 53, a pair of aperture plates 54, 55 and shutter cover 56 covering these. The photographic lens 13 is assembled in the shutter cover 56. The top surface of the dark box base 52 is fitted with analog meter 57 which, interlocked with the cam plate 51, controls the extent of movement of each of the aperture plates 54, 55. The analog meter 57 is a generally known current meter composed of a coil and a magnet, in which the deflection of needle 57a is changed in accordance with the quantity of fed current. The analog meter 57 is connected to the solar cell 18 and supplied with current therefrom. The cam plate 51 is engaged with the needle 57a, so that the extent of movement thereof is determined in accordance with the deflection of the needle 57a.

The shutter blade 53 is of the generally known kick type and comprises blade part 53a and, extending upward thereof, mounting part 53b. The mounting part 53b is engaged with a pin provided on the front of the dark box base 52 and is secured rotatably between closing position for closing the shutter opening 52a and opening position for opening the shutter opening 52a round the pin as a center axis. Spring 58 is fitted between the mounting part 53b and the dark box base 52, and the shutter blade 53 is energized toward the closing position by the spring 58.

When the shutter button 21 is depressed, kick part 21a disposed so as to extend downward thereof suppresses release lever 59. When the release lever 59 is suppressed, shutter charge is released with the result that kick lever 60 kicks the head of the mounting part 53b. As a result, the blade part 53a is rotated so that the shutter opening 52a is opened and closed. Further, the mounting part 53b is provided with suppression part 53c. The suppression part 53c is one for, interlocked with the opening and closing of the shutter, effecting strobe flashing, and, when the shutter blade 53 comes to a full open position, depresses the synchro switch 41 to thereby set the same to an on mode.

The aperture plates 54, 55 at lower portions thereof are provided with approximately semicircular cuts, which are arranged so as to be opposite to each other. The aperture plates 54, 55 have respective holes 54a, 55a, which are engaged with pins provided on the dark box base 52, with the result that the aperture plates 54, 55 are mounted rotatably. Rotation causes the aperture plates 54, 55 to overlap each other so that aperture opening is formed by the cuts. The size of the aperture opening is controlled by the degree of the overlapping.

Further, the aperture plates 54, 55 are provided with long holes 54b, 55b, respectively. Operating pin 58 provided on the cam plate 51 is pushed through the long holes 54b, 55b, so that the aperture plates 54, 55 are interlocked with the cam plate 51. Still further, the aperture plate 54 is fitted with regulation pin 54c. The regulation pin 54c is one for regulating the rotation of the aperture plate 55 and prevents the aperture opening from being fully opened by, for example, an error of engagement of the aperture plates 54, 55.

The cam plate 51 is one for rotating the aperture plates 54, 55. The material thereof consists of, for example, an elastic thin plastic. The cam plate 51 has hole 51a and is rotatably supported by engaging of the hole 51a with pin 61 provided on the body base 32. The top surface of the cam plate 51 is stepwise provided with cam face 51b. When the cam plate 51 is rotated clockwise as viewed from the front, the cam face 51b is brought into contact with the needle 57a. The cam face 51b has a two-step structure furnished with a high face and a low face. The extent of movement of the cam plate 51 exhibits two-stage changes depending on which face thereof is contacted by the needle 57a.

Regulation face 62 is provided integrally with the finder framework so as to be opposite to the cam face 51b above the needle 57a. The regulation face 62 regulates the rotation of the cam plate 51 while pushing the cam face 51b against the needle 57a. Further, the regulation face 62 clasps the needle 57a pushed against the cam face 51b in cooperation with the cam face 51b to thereby fix the position of the needle 57a.

The cam face 51b, when viewed from the front, is so formed that the left side is lower. Therefore, when the deflection of the needle 57a is small, the extent of rotation of the cam plate 51 is small. Contrarily, when the deflection of the needle 57a is large, the extent of rotation of the cam plate 51 is large. In accordance with the change of the extent of rotation of the cam plate 51, the extent of movement of the operating pin 58 is changed, and accordingly the extent of movement of the aperture plates 54, 55 is changed. As a result, the size of aperture opening is controlled in accordance with the subject light quantity.

The rotation of the cam plate 51 is interlocked with the shutter button 21. Thus, an end of the cam plate 51 is provided with interlock lever 63 which extends toward the kick part 21a. The interlock lever 63 is arranged so as to be engaged with protrusion 21b provided on the kick part 21a. When the shutter button 21 is depressed, the interlock lever 63 is pushed up by the protrusion 21b with the result that the cam plate 51 is rotated clockwise. Thus, the aperture plates 54, 55 are operated by the force applied for depressing the shutter button 21. Therefore, any power source for operating the aperture plates 54, 55 is not needed.

Figure 5:
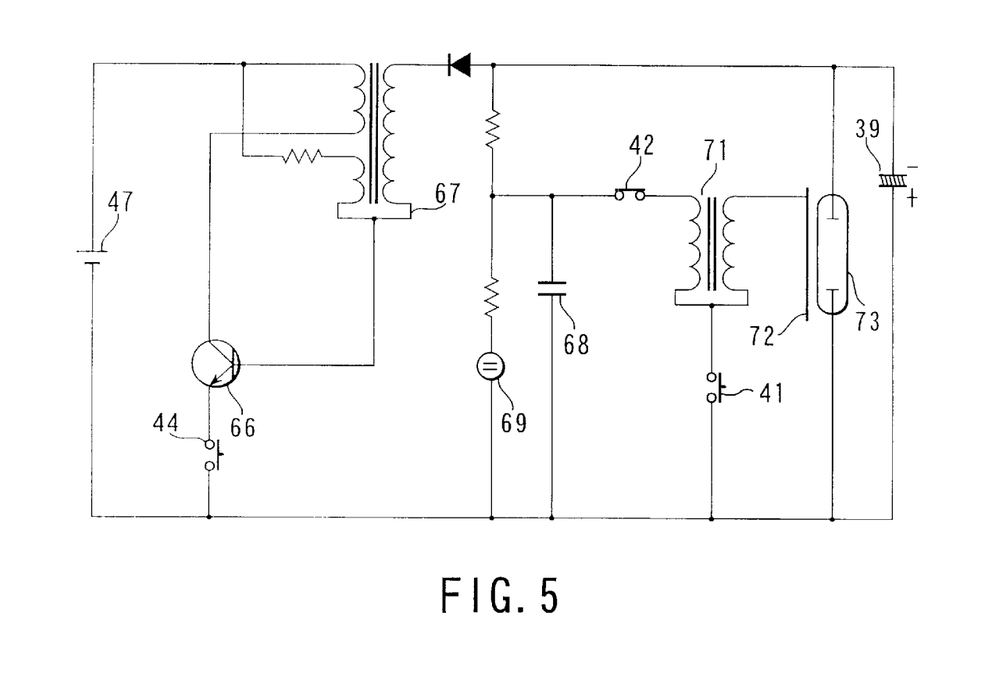
FIG. 5 is a circuit diagram showing a strobe circuit using a solar cell as photometric means.

Referring to FIG. 5 wherein an example of strobe circuit is shown, in the strobe circuit, when the charging switch armature 44 is put on, oscillating transistor 66 becomes conductive and step-up coil 67 is operated. Secondary current obtained from the step-up coil 67 electrifies the main condenser 39 and trigger condenser 68. When the main condenser 39 reaches a specified electrification level, neon tube 69 is lighted. When the synchro switch 41 is put on by the release of the shutter blade 53, discharging of the trigger condenser 68 causes current to flow through the primary side of trigger coil 71, and high voltage is generated in trigger electrode 72 connected to the secondary side of the trigger coil 71. As a result, electric charges stored in the main condenser 39 are released through strobe discharge tube 73, thereby effecting strobe flashing.

The strobe flashing control switch 42 is provided on a current feeding path from the trigger condenser 68 to the trigger coil 71. When the strobe flashing control switch 42 is on, current is fed to the trigger coil 71 to thereby effect strobe flashing. On the other hand, when the strobe flashing control switch 42 is off, strobe flashing is inhibited because current is not fed to the trigger coil 71 even if the synchro switch 41 is put on.

Figure 1A:
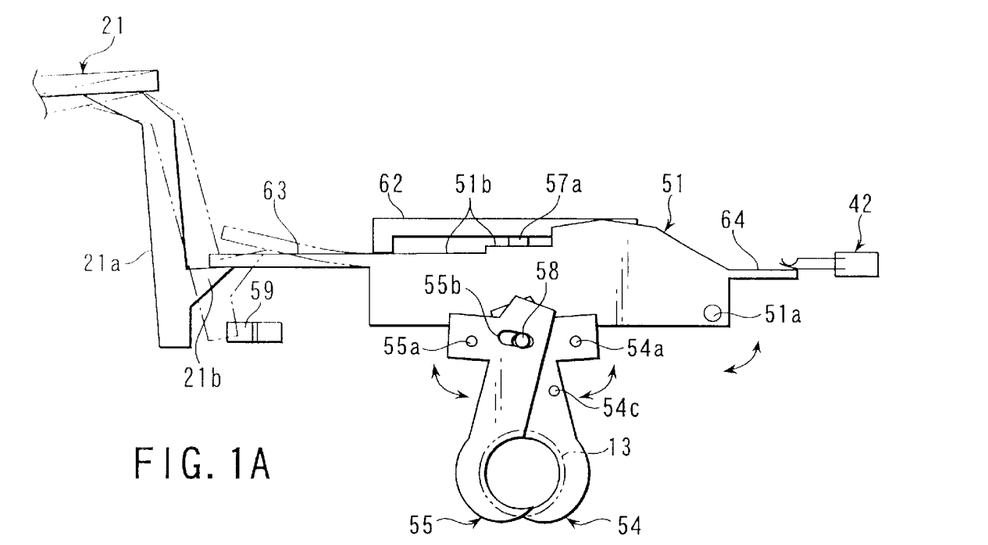
FIG. 1A is an explanatory view showing an aperture controlling mechanism in operating condition, where the subject light quantity is small.

The function attained by the above constitution will be described with reference to FIG. 1 below. Referring first to FIG. 1A, when the subject light quantity is small, the deflection of the needle 57a is small and the needle 57a is positioned opposite to a high face of the cam face 51b. When in this condition the shutter button is depressed by hand, the protrusion 21b pushes the interlock lever 63 up. As a result, the cam plate 51 is rotated clockwise. Upon the rotation of the cam plate 51, the operating pin 58 is moved upward with the result that the aperture plates 54, 55 are rotated in the direction in which these approach each other. Thus, an aperture opening is formed.

The rotation of the cam plate 51 is stopped when the cam face 51b contacts the needle 57a and pushes the needle 57a against the regulation face 62. The extent of rotation of the cam plate 51 is small, so that the diameter of the aperture opening becomes large.

At that time, the needle 57a is sandwiched between the cam face 51b and the regulation face 62 and fixed at that position. Accordingly, the position of the needle 57a is not changed even if the subject light quantity is changed until the shutter button 21 is fully depressed and the shutter is operated. Therefore, it never occurs that the diameter of the aperture opening is changed during the shutter operation.

When, in that state, further the shutter button 21 is depressed, as shown by a two-dot long and two short dashes line in FIG. 1, the interlock lever 63 is further suppressed by the protrusion 21b to thereby undergo an elastic deformation. This elastic deformation permits the full depression of the shutter button 21. When the shutter button 21 is fully depressed, receiving the suppression from the kick part 21a, the release lever 59 is released with the result that the shutter blade 53 is opened and closed.

When the shutter blade 53 is opened and closed, the synchro switch 41 is put on, and, if the main condenser 39 has been charged, strobe flashing is effected. The subject light having been transmitted through the photographic lens 13 is passed through the aperture opening and reaches the photographic film 37 where an image is formed. Since the aperture opening has a large diameter, appropriate exposure can be obtained. When hold of the shutter button 21 is let go, the kick part 21a is detached from the interlock lever 63, so that the cam plate 51 is rotated counterclockwise by its own weight to thereby return to the original position.

Figure 1B:
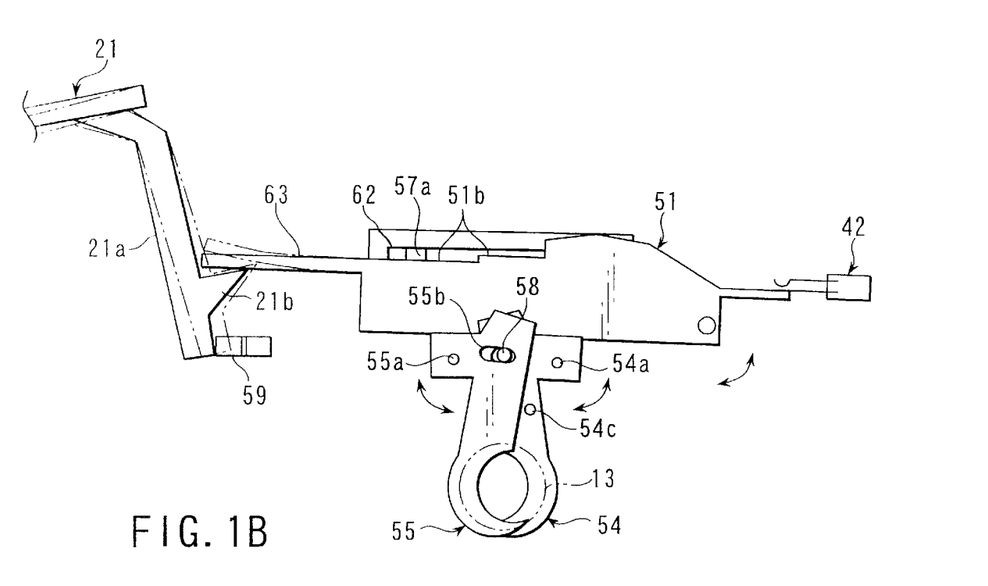
FIG. 1B is an explanatory view showing an aperture controlling mechanism in operating condition, where the subject light quantity is large.

On the other hand, when the subject light quantity is large, the deflection of the needle 57a is so large that the needle 57a becomes positioned opposite to a low face of the cam face 51b, as shown in FIG. 1B. When in this condition the shutter button 21 is depressed by hand, the protrusion 21b pushes the interlock lever 63 up, and the cam plate 51 is rotated until the cam face 51b pushes the needle 57a against the regulation face 62. At that time, the extent of rotation of the cam plate 51 is so large that not only the extent of movement of the operating pin 58 but also the extent of rotation of the aperture plates 54, 55 is increased. Thus, such a control that the aperture opening has a small diameter is accomplished.

When, in this condition, further the shutter button 21 is depressed, as shown by a two-dot long and two short dashes line in the figure, the interlock lever 63 undergoes an elastic deformation, thereby permitting the full depression of the shutter button 21. When the shutter button 21 is fully depressed and the shutter blade 53 is opened and closed, the synchro switch 41 is put on. The subject light having been transmitted through the photographic lens 13 is passed through the aperture opening and reaches the photographic film 37 where an image is formed. Since the aperture opening is controlled so as to have a small diameter, appropriate exposure can be obtained.

Although the above Example describes an instance wherein a solar cell is used as photometric means, the photometric means is not limited to the solar cell and use may be made of a photoconductive element. For example, CdS or a photodiode can be used as the photoconductive element.

Although the above Example describes an instance wherein the cam plate is furnished with two cam faces having different heights and wherein the size of aperture opening is controlled in two stages, the control is not limited to two stages and controlling in more than two stages may be performed by causing the cam face to have more minutely formed stages. Moreover, in place of forming into stages, the cam face may be formed into an inclined surface to thereby enable non-stepwise controlling the size of aperture opening.

Furthermore, with respect to the aperture plate, although the above Example describes an instance wherein the aperture opening is formed by overlapping of two aperture plates, controlling of the stop down value may be conducted otherwise, for example, by providing an aperture plate furnished with a plurality of different aperture openings and moving the aperture plate.

With respect to the specification of the photographic film cartridge, it may be of the IX 240 type or 135 type.

The specification of lens-equipped film unit No. 1 is given in Table 2.

TABLE 2

| Film speed | ISO 1600 |
|---|---|
| Larger stop down value | F6.7 |
| Smaller stop down value | F22 |
| Shutter speed | 1/60 |
| Luminance level | LV 11.0 |
| $G_{No.}$ (ISO 100) | 4.1 |
| $\log_2 (G^2) + \log_2 (1/T)$ | 10.0 |

Figure 11:
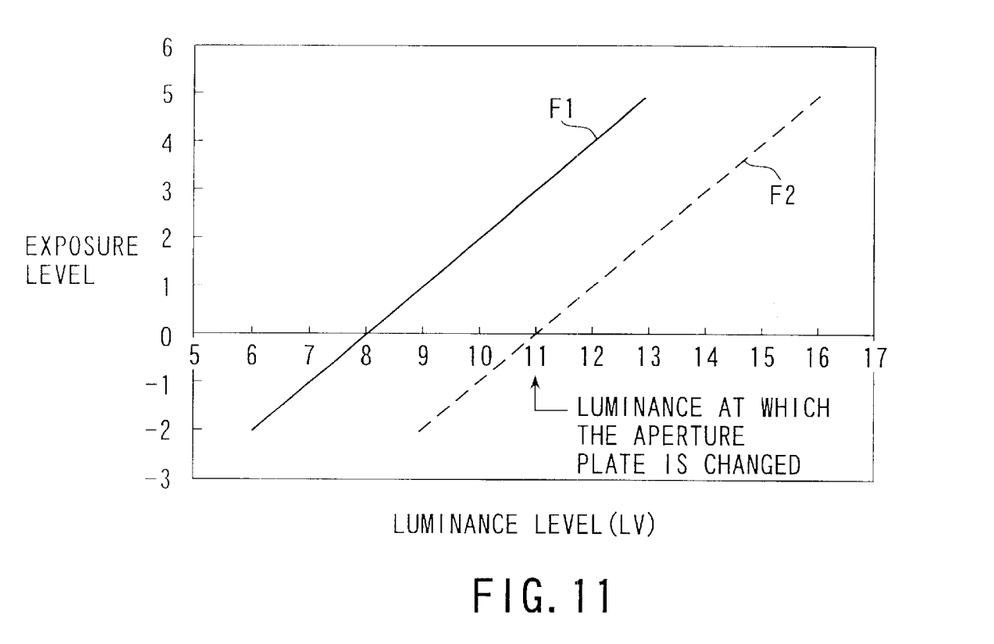
FIG. 11 is a graph showing exposure level at various luminance of lens-equipped film No. 1.

The luminance range in which photographing can be performed by this lens-equipped film unit is given in FIG. 11.

As apparent from FIG. 11, the lens-equipped film unit of the present invention can be used in photographing in a broad exposure range of from LV 6 to LV 16 at the time of non-use of strobe or in a background not reached by strobe light. In the strobe photographing, any 5 m distant main subject can be photographed even in the darkness. In the strobe photographing with a background of LV 6 or more, prints exhibiting an appropriate density ratio of main subject to background can be obtained. The condition of LV 6 or more is nearly satisfied as long as the lighting environment is ordinary. Thus, it is apparent that the lens-equipped film unit of the present invention enables taking photographs of appropriate density in any photographing environments.

Preferred specifications of other lens-equipped film unit constructions will be listed below.

Specification of lens-equipped film unit No. 2

TABLE 3

| Film speed | ISO 800 |
|---|---|
| Larger stop down value | F5.6 |
| Smaller stop down value | F16 |
| Shutter speed | 1/60 |
| Luminance level | LV 11.0 |
| $G_{No.}$ (ISO 100) | 5.0 |
| $\log_2 (G^2) + \log_2 (1/T)$ | 10.6 |

Specification of lens-equipped film unit No. 3

TABLE 4

| Film speed | ISO 1600 |
|---|---|
| Larger stop down value | F5.6 |
| Smaller stop down value | F22 |
| Shutter speed | 1/60 |
| Luminance level | LV 11.0 |
| $G_{No.}$ (ISO 100) | 3.5 |
| $\log_2 (G^2) + \log_2 (1/T)$ | 9.6 |

Specification of lens-equipped film unit No. 4

TABLE 5

| Film speed | ISO 3200 |
|---|---|
| Larger stop down value | F6.7 |
| Smaller stop down value | F18 |
| Shutter speed | $1/125$ |
| Luminance level | LV 11.0 |
| $G_{No.}$ (ISO 100) | 2.5 |
| $\log_2 (G^2) + \log_2 (1/T)$ | 9.6 |

Specification of lens-equipped film unit No. 5

TABLE 6

| Film speed | ISO 1600 |
|---|---|
| Larger stop down value | F8.0 |
| Smaller stop down value | F18 |
| Shutter speed | $1/100$ |
| Luminance level | LV 11.0 |
| $G_{No.}$ (ISO 100) | 3.5 |
| $\log_2 (G^2) + \log_2 (1/T)$ | 11.3 |

Lens-equipped film unit No. 6

Figure 6:
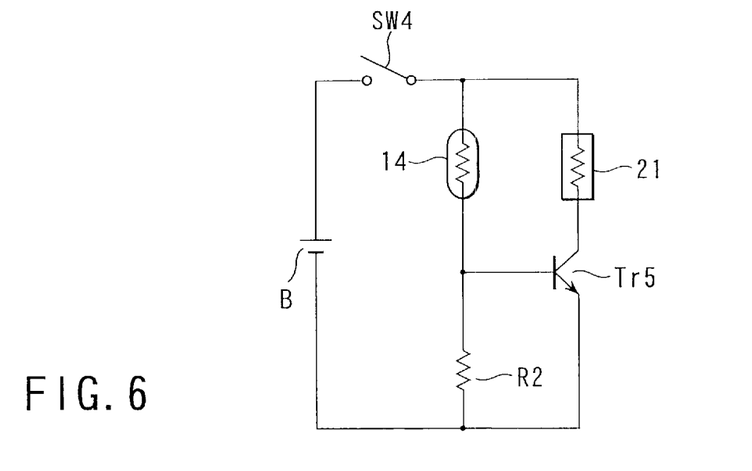
FIG. 6 is a circuit diagram for aperture switching using a shape memory element.

An example of lens-equipped film unit in which use is made of an exposure switching method utilizing a shape memory element will be described below (see FIG. 6).

In this embodiment, shape memory element 21 is disposed in parallel to CdS 14. A collector is connected to the shape memory element 21. Transistor Tr5 is disposed between CdS 14 and resistor R2, the transistor Tr5 having a base connected to these. Solar cell B supplies power only when the subject luminance is higher than given luminance. The transistor Tr5 operates when CdS detects that the subject luminance is higher than a given luminance, and does not operate when CdS detects that the subject luminance is lower than the given luminance.

Therefore, at high luminance, current is passed through the shape memory element 21. The shape memory element 21 effects self heat buildup due to its specific resistance and is deformed to a high-temperature shape by the temperature rise attributed to the heat buildup. On the other hand, at low luminance, current is not passed through the shape memory element 21, so that the shape memory element 21 maintains its ordinary-temperature shape.

Figure 7A:
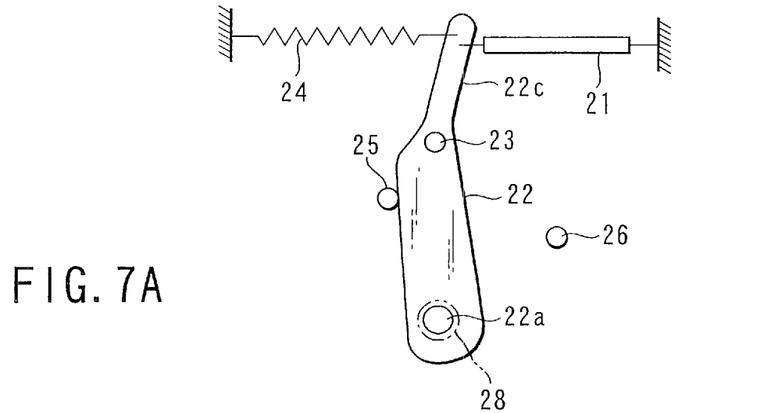
FIG. 7A is a view showing the construction of aperture switching using a shape memory element, where the aperture is small.

Thus, in this embodiment, the aperture is switched by the configurational change of the shape memory element 21. The feature of this aperture switching will be described with reference to FIG. 7. FIG. 7A is a view showing the switching feature at small aperture, while FIG. 7B is a view showing the switching feature at large aperture.

Referring to FIG. 7, small aperture 22a is perforated in aperture plate 22, and the aperture plate 22 is mounted rotatably round supporting shaft 23. Upper part 22c of the aperture plate 22 on its right side is fitted with the above shape memory element 21 with its one end fixed thereto. Upper part 22c of the aperture plate 22 on its left side is fitted with pulling spring 28 with its one end fixed thereto.

As aforementioned, when the subject exhibits high luminance, the shape memory element 21 is deformed to a high-temperature shape. Thus, referring to FIG. 7A, the shape memory element 21 resists the pulling spring 28 and rotates the aperture plate 22 clockwise. The aperture plate 22 is brought into contact with stopper 25 and positioned thereby. At that time, the aperture is switched to the small aperture 22a.

Figure 7B:
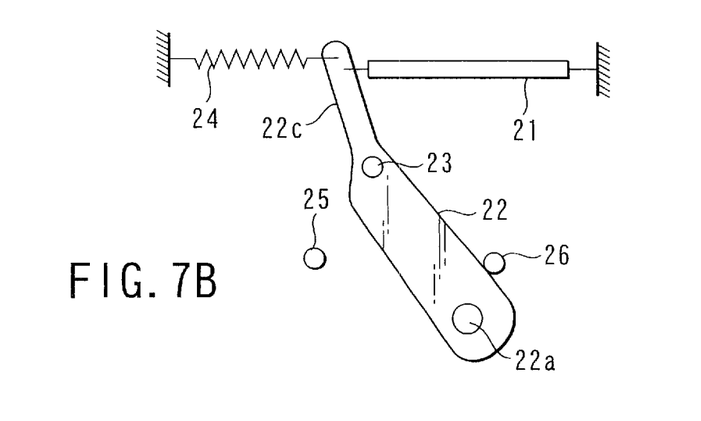
FIG. 7B is a view showing the construction of aperture switching using a shape memory element, where the aperture is large.

On the other hand, when the subject exhibits low luminance, the shape memory element 21 assumes its ordinary-temperature state as shown in FIG. 7B. Thus, the pulling spring 28 rotates the aperture plate 22 counterclockwise, and the aperture plate 22 is brought into contact with stopper 26 and positioned thereby. At that time, the aperture plate is in pass-through condition, so that the opening aperture is switched to large aperture incorporated in the lens.

The shape memory element 21 is not limited as long as there is a difference between the ordinary-temperature shape and the high-temperature shape, depending on whether heat buildup is brought about by current passage, to thereby enable moving the aperture plate 22. For example, use can be made of a shape memory alloy composed of Ti-Ni alloy or a shape memory resin.

Specification of lens-equipped film unit No. 6

TABLE 7

| Film speed | ISO 1600 |
|---|---|
| Larger stop down value | F6.7 |
| Smaller stop down value | F22 |
| Shutter speed | $1/60$ |
| Luminance level | LV 11.0 |
| $G_{No.}$ (ISO 100) | 4.1 |
| $\log_2 (G^2) + \log_2 (1/T)$ | 10.7 |

This specification signifies only an example, and use can be made of any specifications which satisfy the requirements of the present invention, such as those set forth above with respect to the lens-equipped film unit Nos. 2 to 5.

Lens-equipped film unit No. 7

An example of lens-equipped film unit in which use is made of a method of controlling exposure with a filter will be described below.

Figure 8:
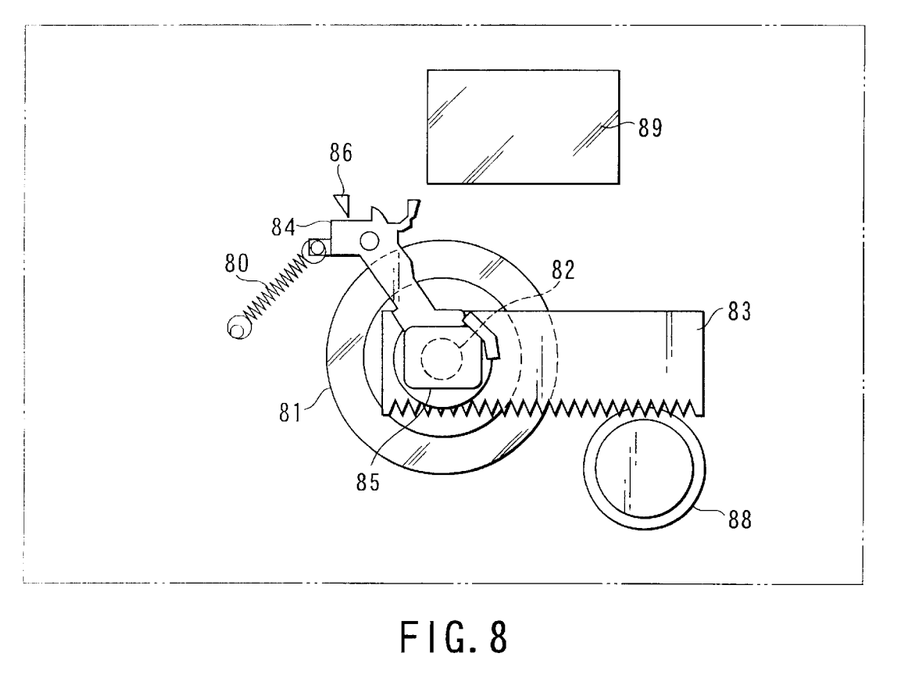
FIG. 8 is a front view of a lens-equipped film unit capable of controlling exposure with the use of a filter.
Figure 9:
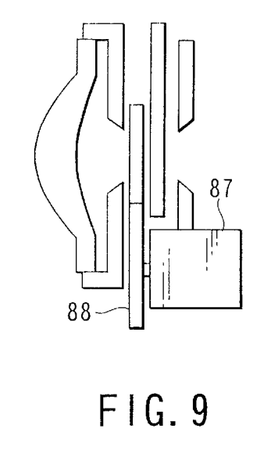
FIG. 9 is a side view of a lens-equipped film unit capable of controlling exposure with the use of a filter.
Figure 10:
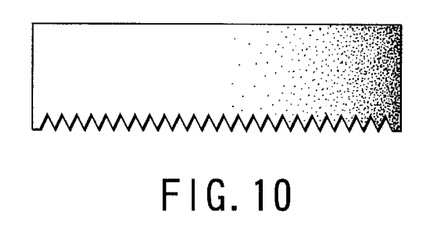
FIG. 10 is a view showing an outline of filter density distribution.

FIG. 8 shows a diagrammatic construction of the lens-equipped film unit of this invention.

The lens-equipped film unit comprises, arranged in sequence from the object side, photographic lens 81 for image formation, aperture hole 82 for determining the F value of the photographic lens 81, filter 83 for controlling exposure, and sector 84 and sector opening 85 for restricting the light flux reaching a film surface. The sector 84 is generally energized by a spring so as to intercept light passage through the sector opening 85. Locking of shutter lever 86 is released by depressing the shutter button, and the shutter lever 86 is moved rightwards in FIG. 8. Claw provided on the top surface of the sector 84 is pushed by that movement, so that the sector 84 initiates rotation in the direction opposite to that of energizing. The rotation of the sector 84 releases the light interception of the sector opening 85, so that the film is exposed to light having been transmitted through the photographic lens 81. Further, when the shutter lever 86 passes over the top surface of the sector 84 in accordance with the above movement of the shutter lever 86, the sector 84 is rotated in the opposite direction by the force of the energizing spring and once more intercepts light passage through the sector opening 85 to thereby terminate photographing. At that time, analog meter 87 conducts rotational motion by given angle corresponding to brightness with the use of the electromotive force of the solar cell. The center shaft of the analog meter 87 is fitted with gear 88. The gear 88 is engaged with the filter 83 provided in photographing light path, so that the position of the filter 83 is changed on occasion in accordance with the extent of rotation of the gear 88. The density of the filter 83 is continuously changed, so that the filter 83 enables keeping the light quantity reaching the film surface at given invariable exposure, not influenced by external light luminance as long as it falls within the control of the analog meter 87, by maintaining the positional relationship between then brightness and filter 83 at given one. Moreover, the aforementioned so-called kick type shutter mechanism controls exposure by reciprocating motion, so that an unevenness of exposure is observed along the right and left direction of the image plane. Illustratively, in the layout of FIG. 8, the sector 84 is rotated clockwise, so that there is such a tendency that the exposure is increased on the right side of the image plane of the figure while the exposure is decreased on the opposite side. In the use of the filter 83 of this embodiment, it is arranged on the image side of the aperture of the photographic lens 81, so that the unevenness of exposure by the sector 84 can be absorbed by increasing the density on the side where the sector 84 begins to open. On the other hand, in the strobe photographing, flashing is performed at the time that the sector 84 is fully opened, so that the unevenness of exposure by the sector 84 does not occur but instead a right and left exposure unevenness by the filter 83 occurs. Thus, in the strobe unit of this embodiment, light distribution characteristics are shifted so as to correct the unevenness of exposure by the filter 83. The change of the density of the filter 83 is 1 EV at 0.3, so that the density change amount within the range of the sector opening 85 is preferably 0.3 or less. Further, the maximum density is a matter to be determined taking into account the size of the sector opening 85 and the extent of movement of the filter 83 and is not a matter to be particularly limited. Still further, the filter 83 can be selected from among those having capability of absorbing given light quantity and being not detrimental to the performance of the photographic lens 81. For example, use can be made of a positive film having photographed a chart with continuous density change.

The specification of lens-equipped film unit No. 7 is given in Table 8.

Specification of lens-equipped film unit 7

TABLE 8

| | |
|---|---|
| Film speed | ISO 1600 |
| Stop down value | F6.7 |
| Smallest transmitted density through filler | 0.02 |
| Largest transmitted density through filler | 0.9 (exposure amount substantially equal to F18) |
| Shutter speed | 1/60 |
| Luminance level | LV 8.0–LV 11.0 |
| $G_{No.}$ (ISO 100) | 4.1 |
| $\log_2 (G^2) + \log_2 (1/T)$ | 10.0 |

Figure 12:
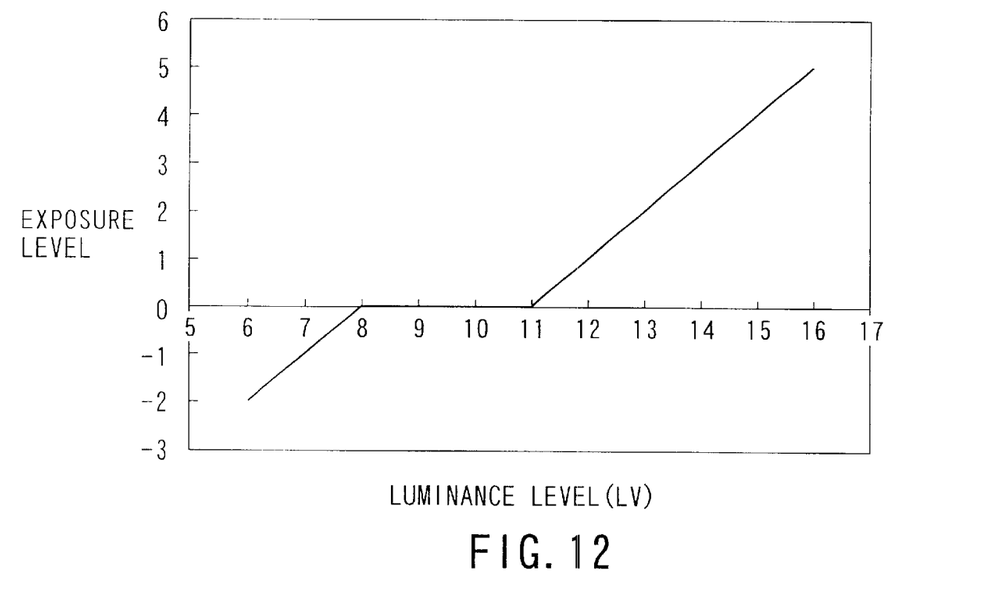
FIG. 12 is a graph showing exposure level at various luminance of lens-equipped film unit No. 7.

In the lens-equipped film unit No. 7, an exposure controlling mechanism works between LV 8.0 and LV 11, and controlling is so performed that the exposure becomes substantially constant in this exposure range. FIG. 12 shows the relationship between subject luminance and exposure level with respect to the lens-equipped film unit No. 7.

This specification signifies only an example, and use can be made of any specifications which satisfy the requirements of the present invention, such as those set forth above with respect to the lens-equipped film unit Nos. 1 to 6.

The use of the lens-equipped film unit of the present invention has enabled realizing all the following matters which the conventional lens-equipped film units have failed to attain:

to reproduce backgrounds with appropriate density on prints even in any photographing conditions ranging from LV 6 to LV 16;

to provide photographs with an appropriate density ratio of main subject/background especially in the low-luminance region as experienced in, for example, indoor or nighttime photographing;

to leave the use of strobe to the user's discretion; and to provide beautiful photographs even when strobe photographing is conducted outdoors in the daytime.

As apparent from the foregoing, satisfactory photographs can be provided in any photographing environments in compliance with the user's requirements.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A lens-equipped film unit comprising:
   a photographing mechanism including a photographic lens, a shutter of a fixed speed, an aperture and a strobe equipment; and an unexposed photographic film being charged therein, wherein
   the photographing mechanism satisfying the relationship:

$$7.0 \leq \log_2(G^2) + \log_2(1/T) \leq 12.5$$

wherein, T represents shutter speed (sec) of the shutter and G represents guide number (ISO 100.m) of the strobe equipment; and
   the film unit further comprising means for outputting a light quantity signal corresponding to a subject light quantity, and a controlling means for changing an exposure quantity to the charged photographic film in accordance with the light quantity signal.

2. The lens-equipped film unit according to claim 1, wherein the controlling means controls the exposure quantity by changing a stop down value of the film unit.

3. The lens-equipped film unit according to claim 1, wherein the controlling means controls the exposure quantity by changing a quantity of light transmitted through the photographic lens.

4. The lens-equipped film unit according to claim 1, wherein the photographing mechanism satisfies the relationship:

$$9.0 \leq \log_2(G^2) + \log_2(1/T) \leq 11.0.$$

5. The lens-equipped film unit according to claim 1, wherein the charged photographic film has a sensitivity of ISO 1000 or more.

6. The lens-equipped film unit according to claim 2, wherein the value $F_1$, representing the brightest stop down value that can be controlled by the controlling means, satisfies the relationship:

$$5.0 \leq F_1 \leq 7.0.$$

7. The lens-equipped film unit according to claim 2, wherein $F_2$, representing the darkest stop down value that can be controlled by the controlling means, satisfies the relationship:

$$12.0 \leq F_2 \leq 32.$$

8. The lens-equipped film unit according to claim 6, wherein $F_2$, representing the darkest stop down value that can be controlled by the controlling means satisfies the relationship:

$$12.0 \leq F_2 \leq 32.$$

9. The lens-equipped film unit according to claim 2, wherein the charged photographic film has a sensitivity of ISO 1000 or more.

10. The lens-equipped film unit according to claim 8, wherein the charged photographic film has a sensitivity of ISO 1000 or more.

11. The lens-equipped film unit according to claim 4, wherein $F_1$, representing the brightest stop down value that can be controlled by the controlling means satisfies the relationship:

$$4.0 \leq F_1 \leq 8.0.$$

12. The lens-equipped film unit according to claim 11, wherein the charged photographic film has a sensitivity of ISO 1000 or more.

13. The lens-equipped film unit according to claim 11, wherein $F_2$, representing the darkest stop down value that can be controlled by the controlling means, satisfies the relationship:

$$12.0 \leq F_2 \leq 32.$$

14. The lens-equipped film unit according to claim 4, wherein the charged photographic film has a sensitivity of ISO 1000 or more.

15. The lens-equipped film unit according to claim 13, wherein the charged photographic film has a sensitivity of ISO 1000 or more.

* * * * *